United States Patent [19]
Topholm et al.

[11] Patent Number: 5,487,012
[45] Date of Patent: Jan. 23, 1996

[54] METHOD OF PREPARING AN OTOPLASTY OR ADAPTIVE EARPIECE INDIVIDUALLY MATCHED TO THE SHAPE OF AN AUDITORY CANAL

[75] Inventors: Jan Topholm, Holte; Svend V. Andersen, Espergaerde; Soren E. Westermann, Hellerup, all of Denmark

[73] Assignee: Topholm & Westermann APS, Vaerloese, Denmark

[21] Appl. No.: 322,039

[22] Filed: Oct. 12, 1994

Related U.S. Application Data

[63] Continuation of Ser. No. 920,561, Aug. 19, 1992, abandoned.

[30] Foreign Application Priority Data

Dec. 21, 1990 [DE] Germany .......................... 40 41 105.2

[51] Int. Cl.$^6$ ...................... G06F 19/00; G05B 19/4097; G06T 17/00
[52] U.S. Cl. .............. 364/474.05; 364/468; 364/474.24; 395/120; 395/161
[58] Field of Search ................. 364/474.05, 474.24, 364/474.37, 428.13, 468; 264/40.1, 222; 381/68, 68.1, 69, 69.1, 69.2; 395/118, 119, 120, 161; 425/2

[56] References Cited

U.S. PATENT DOCUMENTS

| | | | |
|---|---|---|---|
| 5,056,204 | 10/1991 | Bartschi | 364/474.05 |
| 5,121,333 | 6/1992 | Riley et al. | 364/474.05 |

*Primary Examiner*—Joseph Ruggiero
*Attorney, Agent, or Firm*—Sughrue, Mion, Zinn, Macpeak & Seas

[57] ABSTRACT

A process for making otoplasty or adaptive ear pieces individually matched to the shape of an auditory canal and consists of the following steps: a) direct or indirect tracing is provided of the shape of the auditory canal and conversion of the values obtained into digital form; b) conversion of the digital representation of this shape into a multi-dimensional computer model of the outer shape of otoplasty or adaptive ear piece; c) selection of the various components/functions for the inside of the computer model with simultaneous establishment of the wall thickness and optimization of the positions of the components/functions for best possible operation and minimum bulk; d) computer controlled production of an otoplasty or adaptive ear piece from the data thus obtained from the optimized, three-dimensional computer representation of the otoplasty or adaptive ear piece.

38 Claims, 11 Drawing Sheets

METHOD OF PREPARING AN OTOPLASTY OR ADAPTIVE EARPIECE INDIVIDUALLY MATCHED TO THE SHAPE OF AN AUDITORY CANAL

This is a Continuation of application Ser. No. 07/920,561 filed Aug. 19, 1992, abandoned.

BACKGROUND OF THE INVENTION

The invention relates to a process for making otoplasties or adaptive earpieces, consisting of one part or several independently processable parts, which are individually matched to the shape of the auditory canal.

If an adaptive earpiece or, in particular, an otoplasty is to be individually produced today for an in-the-ear nearing aid, this requires a large number of process steps which are extremely time-consuming, work-intensive and thus expensive.

The following work must essentially be performed manually:

1. Production of one more ear impressions of the patient;
2. processing of the ear impression for production of a mold. To do this, excess material must be removed from the ear impression, small flaws in the impression repaired and some parts of the ear impression increased in size. Finally, the ear impression musk be immersed in a wax or similar fluid to smooth the surface.
3. Finally, a mold is made from the ear impression which may consist of plaster, a gel or silicone resin.
4. A polymerizable liquid synthetic resin in the desired mixture is then produced, poured into the mold and polymerized at least partially. If the product is a shell for an individually tailored in-the-ear hearing aid, most of the liquid synthetic resin must be poured out of the mold again before it completely polymerizes.
5. The mold is normally destroyed when the cast is removed from it.
6. The adaptive earpiece or otoplasty is subsequently ground to the correct size and required appearance.
7. Normally, it is then necessary to produce a ventilation channel, which can be done in different ways.
8. After this, a sound outlet opening must be produced by drilling.
9. Finally, the adaptive earpiece or otoplasty must be polished.

If the cast is intended for an in-the-ear hearing aid, further process steps are additionally necessary:

10. It must be ensured that there is sufficient space for the hearing aid components (microphone, amplifier, battery, volume control, earphone etc. ).
11. The earphone must be inserted as deep as possible in the part of the otoplasty located in the auditory canal and secured here. Often, there is very little space here to accommodate both the earphone and the ventilation channel, which normally has a circular cross-section, in the part of the otoplasty which is located deep in the auditory canal.
12. In addition, a telephone coil should also be accommodated somewhere inside the otoplasty.
13. In addition, it may be the case that the microphone also has to be located individually.
14. Finally, the cover plate must be secured on the otoplasty, either by bonding or polymerization.

Overall, this normally followed method thus consists of a large number of manual process steps which require a great deal of time and which nevertheless involve a good deal of uncertainty, since many of the steps are difficult to monitor and check. The wall thickness and the interior cavity of an otoplasty for in-the-ear hearing aids can be mentioned as examples of this, since these often deviate from the desired values when the manual method is used. In some cases, excess material has to be removed from the interior cavity with a dental drill or grinding wheel in order to create sufficient space for the earphone, ventilation channel etc. However, even this method is not well defined and supplies practically unpredictable results.

For this reason, many attempts have already been made to solve this problem, because in-the-ear hearing aids manufactured using these methods in the past have mostly been of poor quality and possessed hardly foreseeable characteristics.

Modular in-the-ear hearing aids where a module which already contains all components of the hearing aid is molded into an individually produced otoplasty have not proven to be especially successful, probably partly because they are normally slightly larger. This is because the components within the module are arranged in fixed positions. In addition, these hearing aids often had the appearance of composite or hybrid devices. It is the task of the present invention to:

SUMMARY OF THE INVENTION 1. completely or almost completely automate production of individually matched adaptive earpieces or housings of in-the-ear hearing aids or otoplasties;
2. permit optimum utilization of the space available in the auditory canal and in the outer ear, with the result that the smallest possible hearing aid can be produced;
3. ensure optimization of position and form of all internal functions and components of an in-the-ear hearing aid and
4. to describe methods for manufacture of well-defined hearing aids and adaptive earpieces of constantly uniform quality, which also appear particularly attractive from a cosmetic point of view at the same time.

This task which forms the basks of the invention is solved by the invention by way of the following process steps:

a) Direct or indirect tracing of the shape of the auditory canal and conversion of the values obtained into digital form;

b) conversion of the digital representation of this shape into a three dimensional or multi-dimensional computer model of the outer shape of the otoplasty or adaptive earpiece;

c) selection of the various components/functions for the inside of the computer model with simultaneous establishment of the wall thickness and optimization of the positions of the components/functions for best possible operation and minimum bulk;

d) computer-controlled production of an otoplasty or adaptive earpiece from the data thus obtained from the optimized three-dimensional computer representation of the otoplasty or adaptive earpiece.

BRIEF DESCRIPTION OF THE DRAWINGS

The invention will now be explained in more detail in conjunction with the enclosed drawings on the basis of various example embodiments, whereby the first three sections of the basic solution are essentially common to them all.

The drawings show the following:

FIG. 15(a–b) schematic diagram of the subtractive multi-block method;

DETAILED DESCRIPTION OF THE INVENTION

Figure 1:
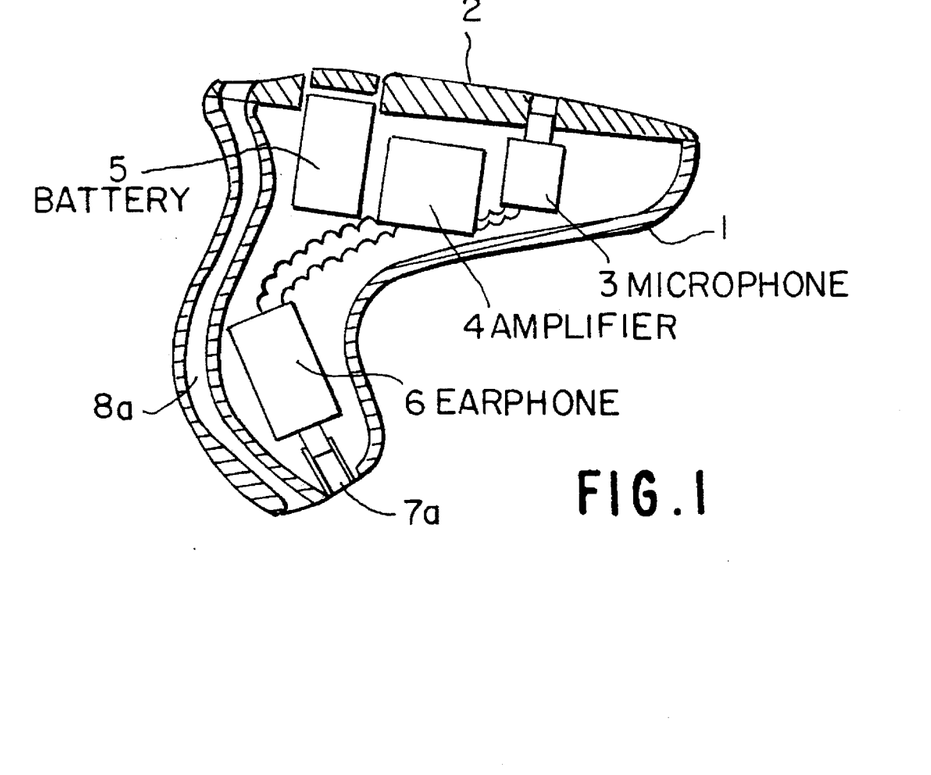
FIG. 1 a cross-sectional view of an in-the-ear hearing aid.

FIG. 1 schematically shows an in-the-ear hearing aid with a shell or otoplasty I which is closed by a cover plate 2. The hearing aid contains a microphone 3, an electronic amplifier section 4, a battery 5, an earphone 6 and finally a sound outlet channel 7a as well as a pressure compensating or ventilation channel 8a.

Figure 2:
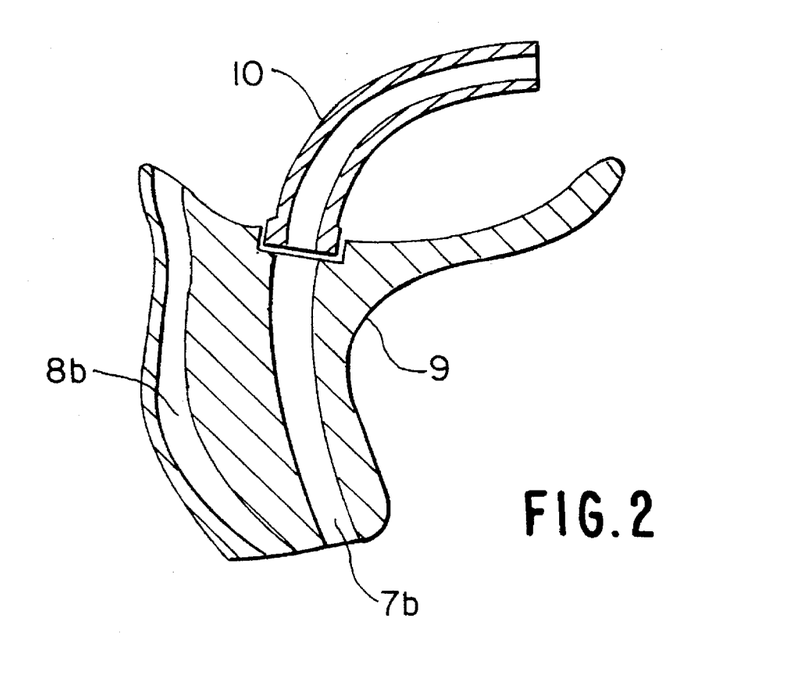
FIG. 2 a schematic cross-sectional view of an adaptive earpiece.

FIG. 2 shows an adaptive earpiece or ear tip 9 with a sound tube 10 leading to a hearing aid (not shown), a sound outlet channel 7b and a ventilation channel 8b.

In principle, the production method for both embodiments is essentially the same, apart from the fact that in one case (hearing aid) components are included, while this is not normally so in the other case.

Figure 3:
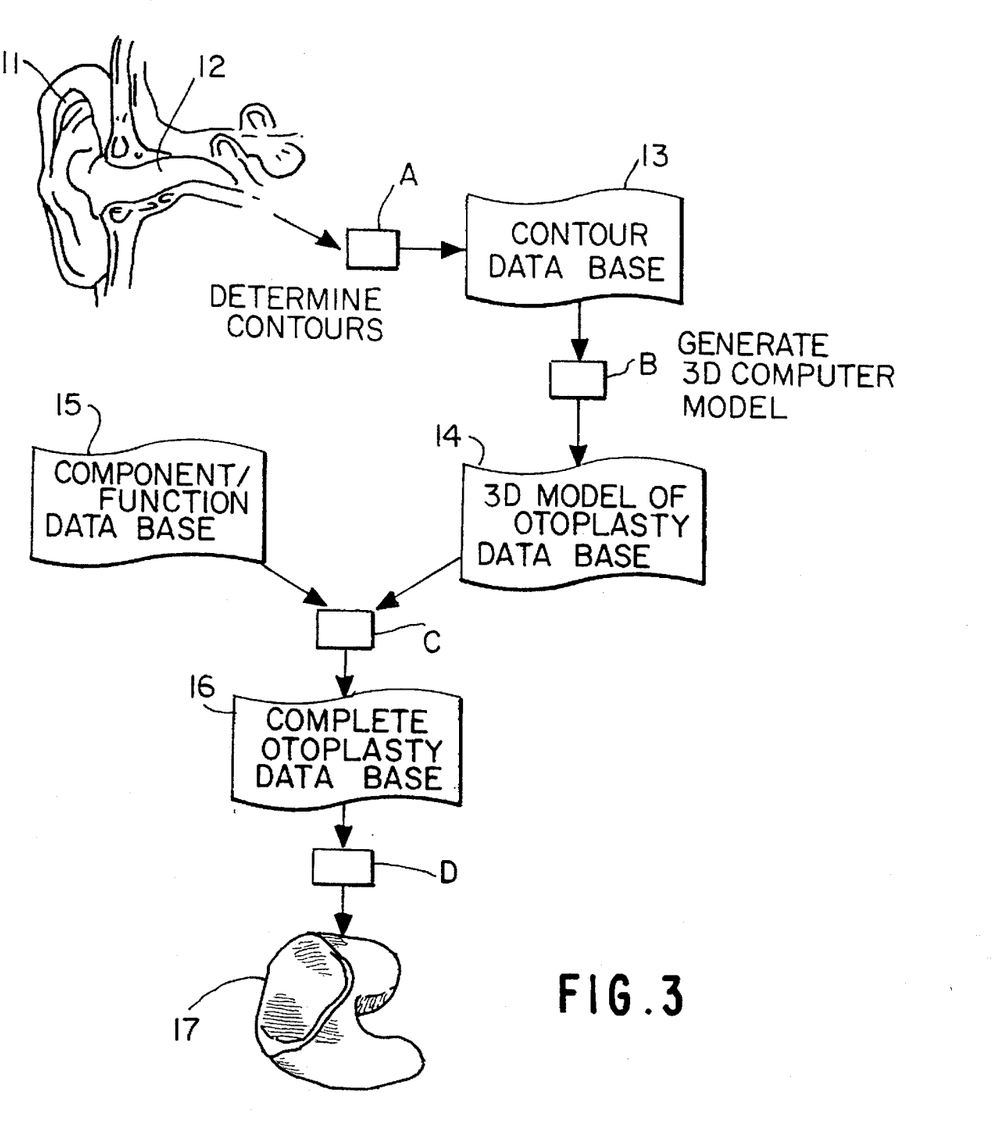
FIG. 3 a flow chart or sequence diagram of the process steps for designing an otoplasty in accordance with first example.

The general principle of the invention is shown in FIG. 3. A schematically shown ear 11 possesses an auditory canal 12, whose contours have to be determined. This can be done statically and dynamically. This will be discussed in more detail later on.

In the case shown in FIG. 3, the contours of the auditory canal are determined at A and digitally stored in a data base 13. This digital data is converted into a three-dimensional computer model of the otoplasty at B and saved in a data store 14. All components/functions for the in-the-ear hearing aids or adaptive earpieces are stored in a further data base 15. This should be understood as meaning that the dimensions and performance data of all available components and functions are stored in this data base so that they can be called when required, i.e. also various sizes of earphones, microphones, amplifier sections, batteries, etc. This data base will be created if it does not already exist and constantly kept up to date and supplemented or modernized.

The data stored in the data bases 14 and 15 is then used at C in order to optimally incorporate the necessary functions/components in the three-dimensional computer model, e.g. of an in-the-ear hearing aid. As a result of this, a complete model of the otoplasty or adaptive earpiece is obtained in the memory 16, which may also be part of a general data base. The otoplasty 17 is then produced in a computer-controlled production process D on the basis of this model of the otoplasty or adaptive earpiece stored in the computer, whereby the otoplasty is then subsequently processed in the usual way. This naturally also applies as well to an adaptive earpiece.

Figure 4:
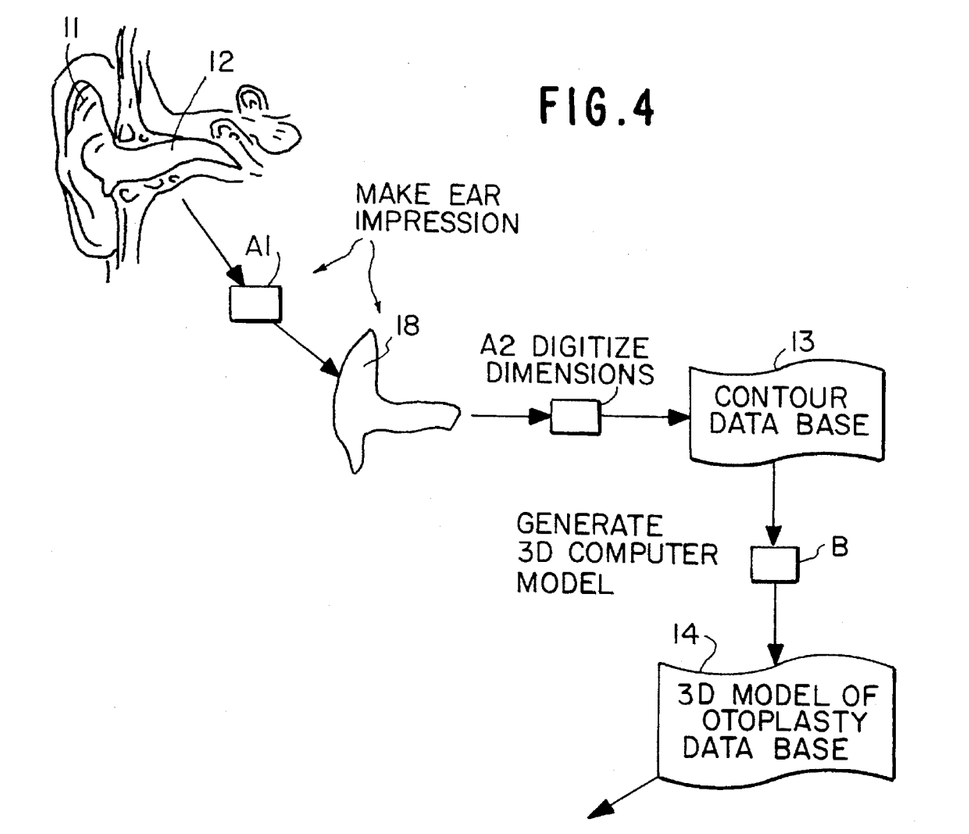
FIG. 4 a flow chart of a static method of tracing the contours of an auditory canal in accordance with the present invention.

A static method for tracing the contours of an auditory canal is shown in principle in FIG. 4. An ear impression 18 is made of the ear 11 with its auditory canal 12 at A1, the dimensions of this digitized at A2 and this information then stored in a memory area 13. As before, this data is converted into a 3-dimensional computer model at B and then stored in a data base at 14.

Conversion of the contours of the ear impression can occur in a wide variety of ways. For example, the contours of the ear impression can be recorded without destruction by means of radiation, e.g. X-rays or ultrasound, passing through the ear impression, with scanning taking place in uniform successive cross-sectional planes, for example. The external contours of the ear impression can also be determined by means of laser interferometry.

A further practical possibility is to divide or cut the ear impression into thin layers in successive steps and to record the dimensions of these layers with a video camera, for example.

Figure 5:
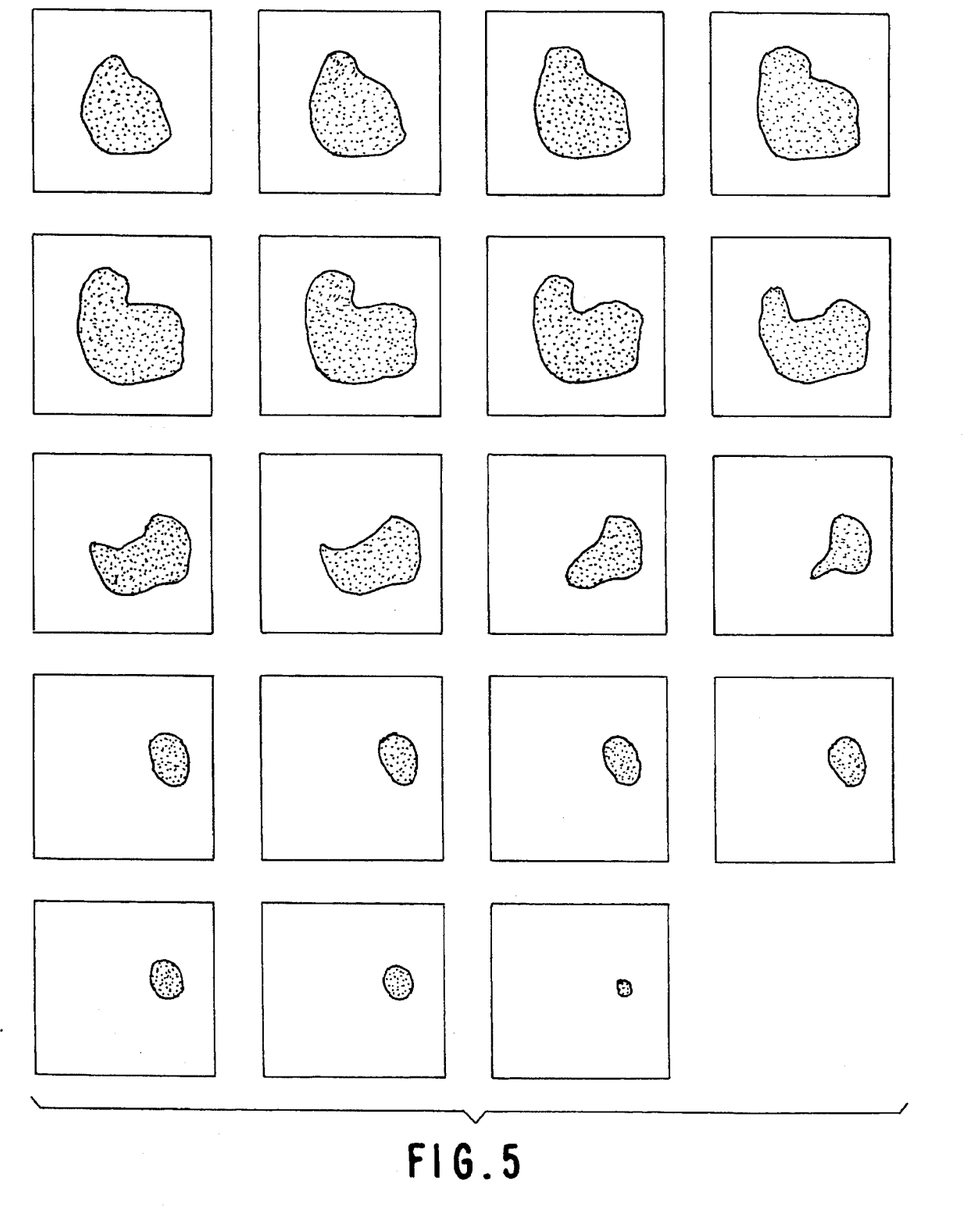
FIG. 5 representations of individual cross-sections of an ear impression obtained by tracing.

These methods can be improved further by embedding the ear impression in a plastic block with contrasting color. This improves recording of the contours both for destruction-free scanning and for cutting. These cross-sections may then appear as shown in FIG. 5, for example. It must be noted here that the cuts or cross-sectional planes need not necessarily possess uniform distances or uniform layer thicknesses. It is sufficient if a new cross-section is determined only when this differs from the previous cross-section by previously defined minimum dimensions.

Finally, it iS also possible to mill or grind off from the ear impression in successive steps thin layers of uniform or non-uniform thickness and to then trace and digitally store the resultant surface.

In addition, the contours of the auditory canal can also be traced by means of contactless scanning, e.g. by ultrasound. In this special case, it is even possible to achieve dynamic recording of the auditory canal contours.

In principle, recording of the contours of the auditory canal must be seen spatially, i.e. in a multi-dimensional recording system which records and describes the interior space of the auditory canal. However, since the contours of the auditory canal change as a result of speaking, eating, drinking etc., this method of acquiring the data on the contours of the auditory canal provides scanning values which vary in time (i.e. a fourth variable), which means that these changing contours can also be taken into consideration. It is thus possible to realize an even better otoplasty or adaptive earpiece form than with the static method.

Figure 6:
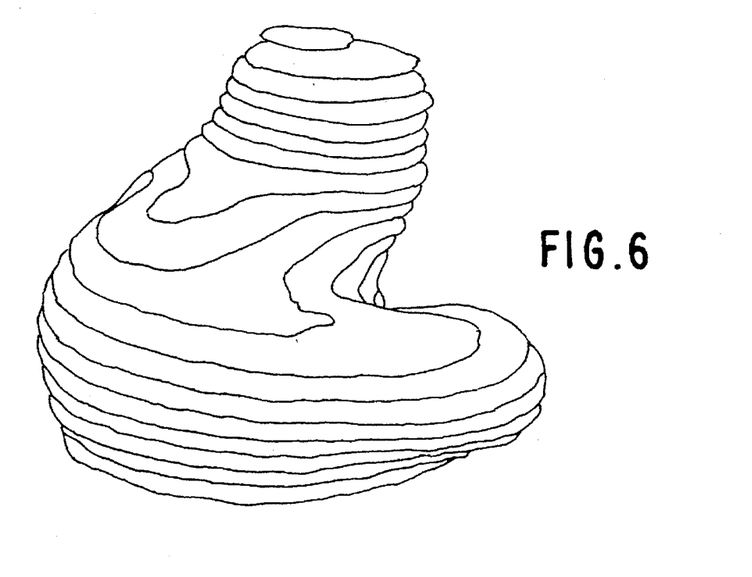
FIG. 6 computer representation of cross-sectional planes obtained by tracing.

FIG. 6 then shows a computer representation of cross-sections obtained by scanning.

Figure 7:
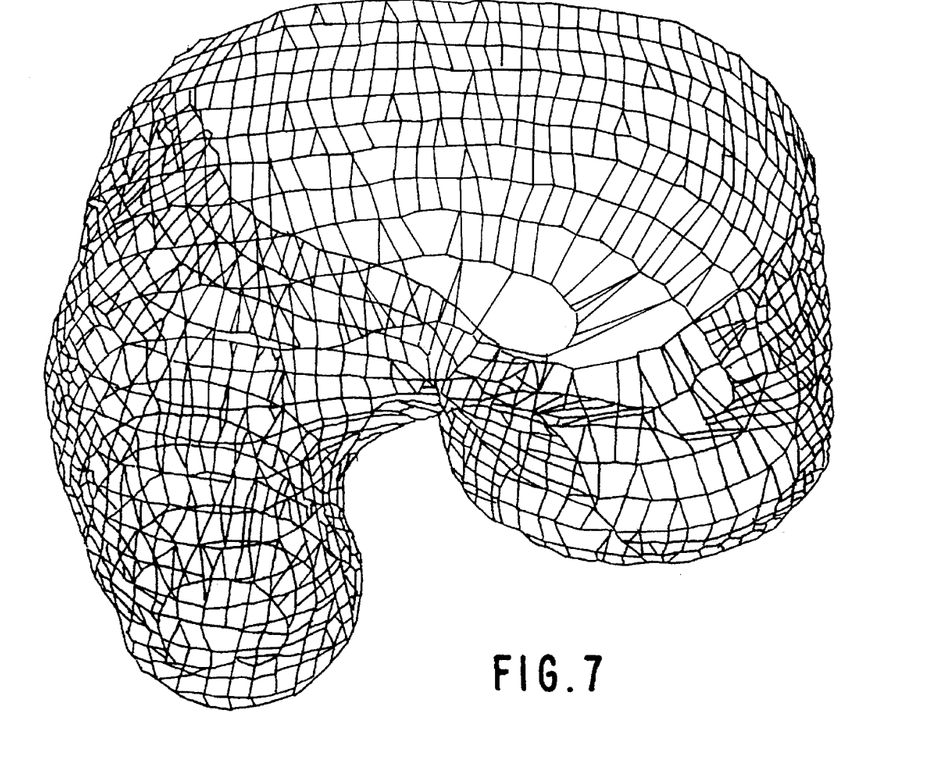
FIG. 7 representation of the outer surface of an otoplasty as a three-dimensional model calculated using the finite element method.
Figure 8:
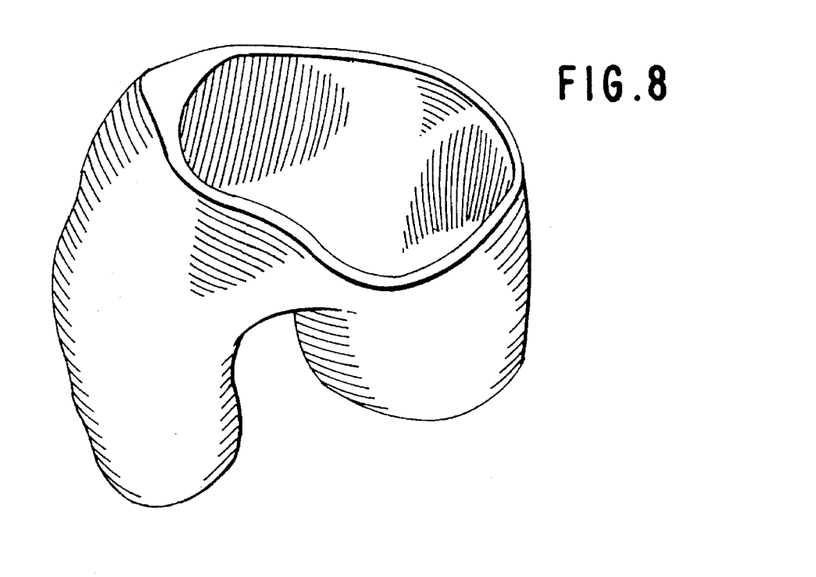
FIG. 8 representation of the three-dimensional computer model of the otoplasty with already calculated wall thickness for definition of the interior cavity at the inner surface.

When the digitized data of the auditory canal is available in the memory, it is possible to start with conversion of this data using algorithms known from the field of CAD/CAM technology to produce a three-dimensional computer representation of the external contours of the otoplasty or adaptive earpiece, e.g. using the finite element method. This is shown schematically in FIG. 7 (also refer to FIG. 3, items 14, 15 and 16 and C). In this context, it is also then possible to immediately define the minimum wall thickness, which simultaneously represents the outermost boundary surface for the components/functions and their optimum arrangement, This is shown in FIG. 8, also in a computer representation.

This conversion can of course be performed either interactively or fully computer-controlled: After this, it is necessary to define the chambers for the earphone and the compensating channel, whereby the compensating channel is provided either with a uniform cross-section or with a stepped, preferably multiply stepped, cross-section in order to achieve a low-pass filter effect before the channel is then digitized and represented in a three-dimensional computer model. The program could then adapt the path of the compensating channel to the given conditions in order to permit optimum utilization of the available space inside the otoplasty. The earphone chamber can then be taken from the data base 15 or from a data base library of three-dimensional models and different functions. This allows the earphone to be arranged as deep as possible in the inner end of the otoplasty, for example. However, it is also necessary to perform a computer-controlled check to establish whether the earphone can be inserted up to the end of the otoplasty located furthest into the auditory canal when it is finally inserted in the device.

In the same way, it is possible to select the amplifier block, microphone chamber and, where appropriate, a telephone coil chamber from the data base for components/functions and to interactively or automatically arrange these in an optimum position inside the otoplasty.

When all functions/components have been arranged in their optimum positions in the three-dimensional computer model, i.e. not physically, it may be necessary to fill in a small amount of "material" here and there in order to ensure proper manufacture later on. It may also be necessary to provide a number of support parts for some production methods which initially facilitate production but which must be removed later on.

The actual production process will now be described on the basis of the three-dimensional computer model of the otoplasty or adaptive earpiece stored in the memory or data base.

In the actual computer-controlled production of the otoplasty or adaptive earpiece, a basic distinction is made between two variants, namely an additive method, i.e. build-up of the otoplasty or adaptive earpiece in successive steps, either continuous or discontinuous, and a subtractive method, where prefabricated blocks are used from which material is removed until the final shape of the adaptive earpiece or otoplasty has been achieved. This will be described in detail later on.

Figure 9:
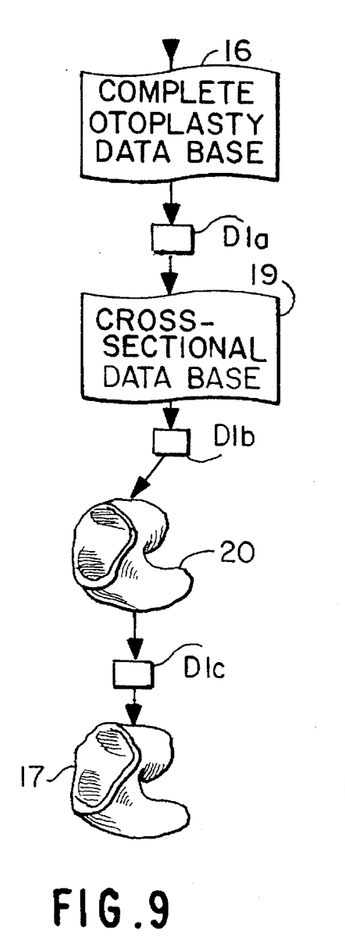
FIG. 9 flow chart for fabricating an otoplasty in accordance with the present invention.

FIG. 9 shows a first possible method.

On the basis of the data stored in the data base 16, this three-dimensional computer model is converted into a number of cross-sections in step D1a. These cross-sections may be equidistant, but need not be. They need also not be plane-parallel and horizontal. The preferably two-dimensional cross-sectional planes are stored in a data base 19. Using this data base, the otoplasty can then be produced by producing the individual cross-sectional planes successively and on top of each other, underneath each other or next to each other and then joining them to each other. Thus, for example, a sterolithographic or similar method can be used as step D1b. The result is a "raw product", e.g. an otoplasty 20, which must be reworked in step D1c in order to obtain the finished otoplasty 17.

These methods can be performed in quite different ways. For example, a container with activated liquid synthetic resin may be located on a computer-controlled movable platform. By targeted use of radiation directed at the surface of the liquid synthetic resin and causing at least part-polymerization of the synthetic resin, it is possible to generate a first cross-section of the otoplasty. After this, it is necessary to lower the platform by the thickness of a layer after each cross-section is completed so that the next cross-sectional plane on the surface of the liquid synthetic resin can be produced in the same way. This is then continued until the at least partially polymerized otoplasty can at last be removed from the container. The same naturally also applies to production of an adaptive earpiece.

In a different method, a container located on a platform contains a liquid synthetic resin which can be activated by an activator. An injection nozzle whose position can be controlled in three dimensions is located above the container through which an activator can be injected into the liquid synthetic resin from bottom to top in a progressive manner, either intermittently or continuously, in order to then build up the otoplasty in the liquid synthetic resin as the latter hardens at least partially when the synthetic resin and activator come together. This can be supported by supplying heat by IR lamps or by the presence of UV radiation.

Figure 10:
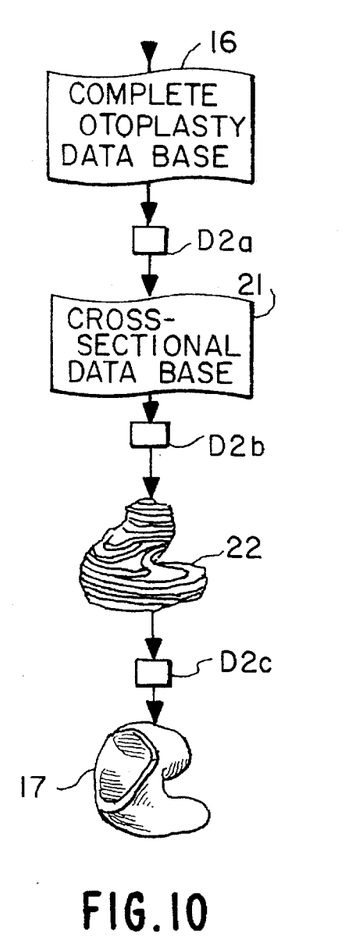
FIG. 10 flow chart of the method of forming an otoplasty from liquid synthetic resin in accordance with the present invention, by production of cross-sectional planes and stacking of these "slices" on top of each other.

FIG. 10 shows the principle of this method.

Starting from the data base 16 in which the three-dimensional computer model is stored, this model is converted in step D2a into a number of two-dimensional cross-sections and then stored in the data base at 21. The adaptive earpiece is then produced at step D2b by injection of the activator in the liquid synthetic resin mass, thus producing the raw model shown at 22, which is then reworked at D2c to finally produce the finished otoplasty 17.

The same naturally also applies to an adaptive earpiece.

A further elegant method is to again derive two-dimensional cross-sections from the three-dimensional computer model stored in the data base 16 and to then store these in a data base similar to 19 in FIG. 9 or 21 in FIG. 10. A computer-controlled cutter is then used to produce the individual cross-sectional planes, cutting the individual cross-sections out of a synthetic resin film or synthetic resin plate, which may already be partially polymerized, for example, whereby these cross-sections are then stacked on top of each other and joined together. A laser is suitable as a cutter, particularly a so-called Eximer laser functioning in the ultraviolet range. The base surface for the synthetic resin film or the synthetic resin plate may be a conveyor belt with the film or sheet located on top of it, for example, so that the cross-sections can be produced consecutively. Alternatively, the base surface may also be a rotating wheel. It is also possible to supply material in the same way as for a punch and to produce, stack and join the individual cross-sections successively, i.e. glueing, welding, screwing or bonding into one piece by polymerization.

A further possibility is to produce these cross-sections in a kind of printing method similar to that used in a ink-jet printer, for example, by consecutively producing successive cross-sections using a kind of printing technique and, after at least partial polymerization which should already take place at the printing operation, by then stacking them on top of each other and joining them to form an otoplasty. An otoplasty produced in this way must of course also be reworked in the normal manner to produce the finished otoplasty 17.

Figure 11:
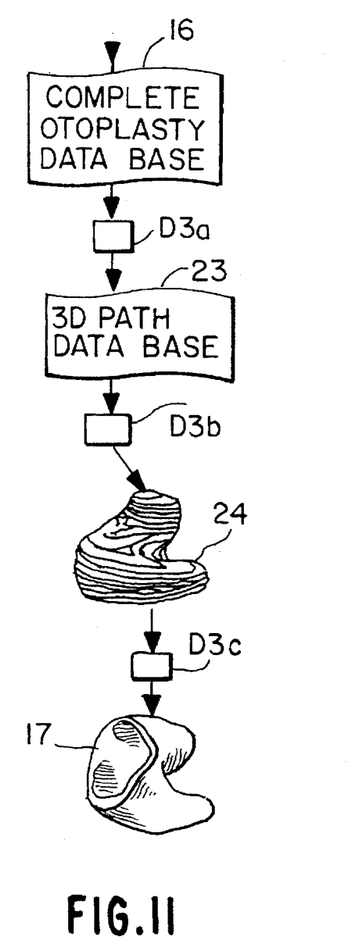
FIG. 11 flow chart of the extrusion method in accordance with the present.

FIG. 11 Shows a further suitable method for production of an otoplasty or adaptive earpiece. Starting from the data base 16 with the three-dimensional computer model stored in it, a three-dimensional path is generated in step D3a which describes the three-dimensional computer model of the otoplasty or adaptive earpiece on all sides. This is stored in the data base 23. In order to produce the otoplasty, an extrusion nozzle whose movements can be controlled in three dimensions is arranged above a platform from which synthetic resin is continuously or discontinuously extruded, whereby the resin polymerizes at least partially upon emergence from the nozzle and application onto the platform, until the extruded body of an otoplasty as shown in 24 has been produced. This is then reworked in the usual way in step D3c to produce in turn the finished otoplasty 17.

The same naturally also applies to production of an adaptive earpiece.

Figure 12:
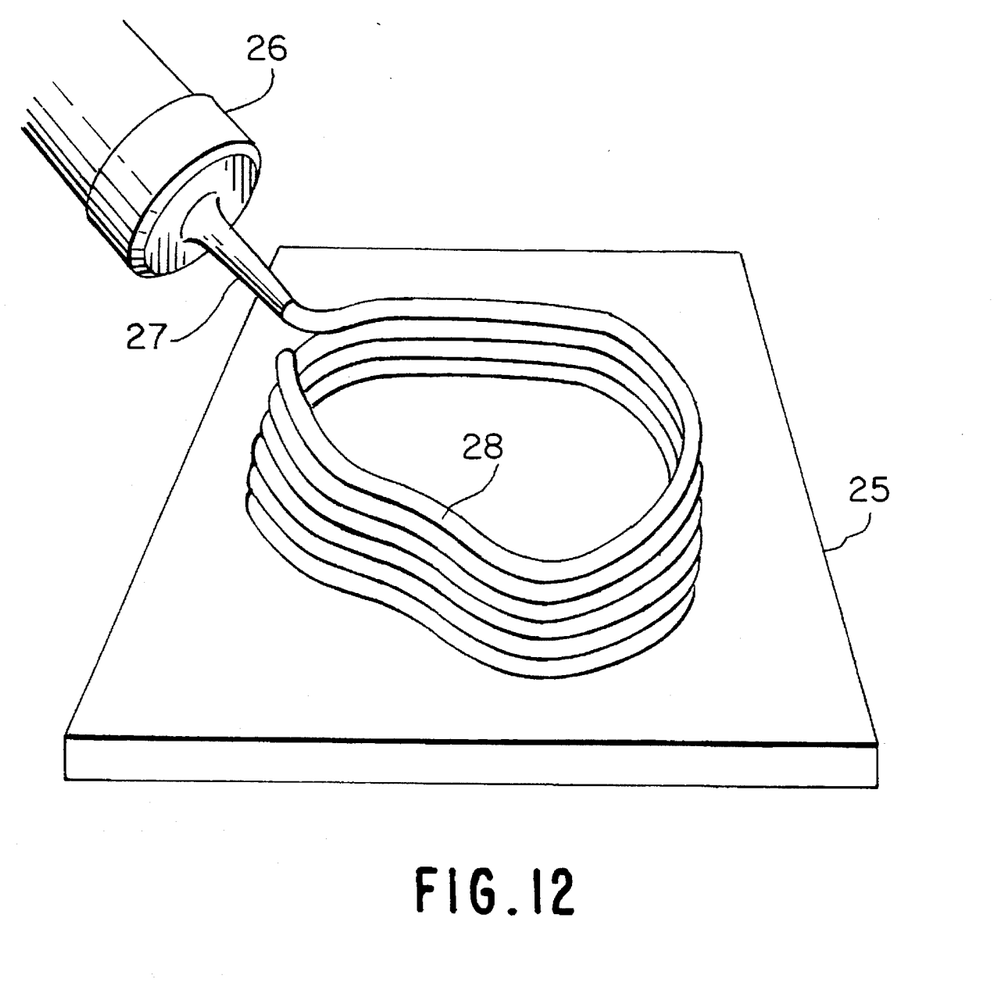
FIG. 12 schematic diagram of the build-up of an otoplasty or adaptive earpiece using the extrusion method.

FIG. 12 schematically shows the same method. An extrusion device 26 whose movements can be controlled in three dimensions and which is equipped with an extrusion nozzle 27 is located above a platform 25 from which a strand of a polymerizable liquid or pasty synthetic resin is applied to the platform in order to form the otoplasty. For this purpose, the nozzle 27 may also be kept stationary and the platform made to execute a corresponding multi-dimensional movement. However, it may also be expedient to control both the position of the nozzle 27 and the position of the platform 25.

The subtractive method will now be explained in the following sections on the basis of example embodiments.

Since the auditory canal often possesses small or large bends and curves, it is normally not possible to hollow out the interior from the solid in the necessary way by means of drilling or milling devices when producing an adaptive earpiece or an otoplasty. The external contours of an adaptive earpiece or an otoplasty can normally be produced with a numerically controlled milling cutter and this could also be used satisfactorily. This will be examined in more detail below.

Figure 13:
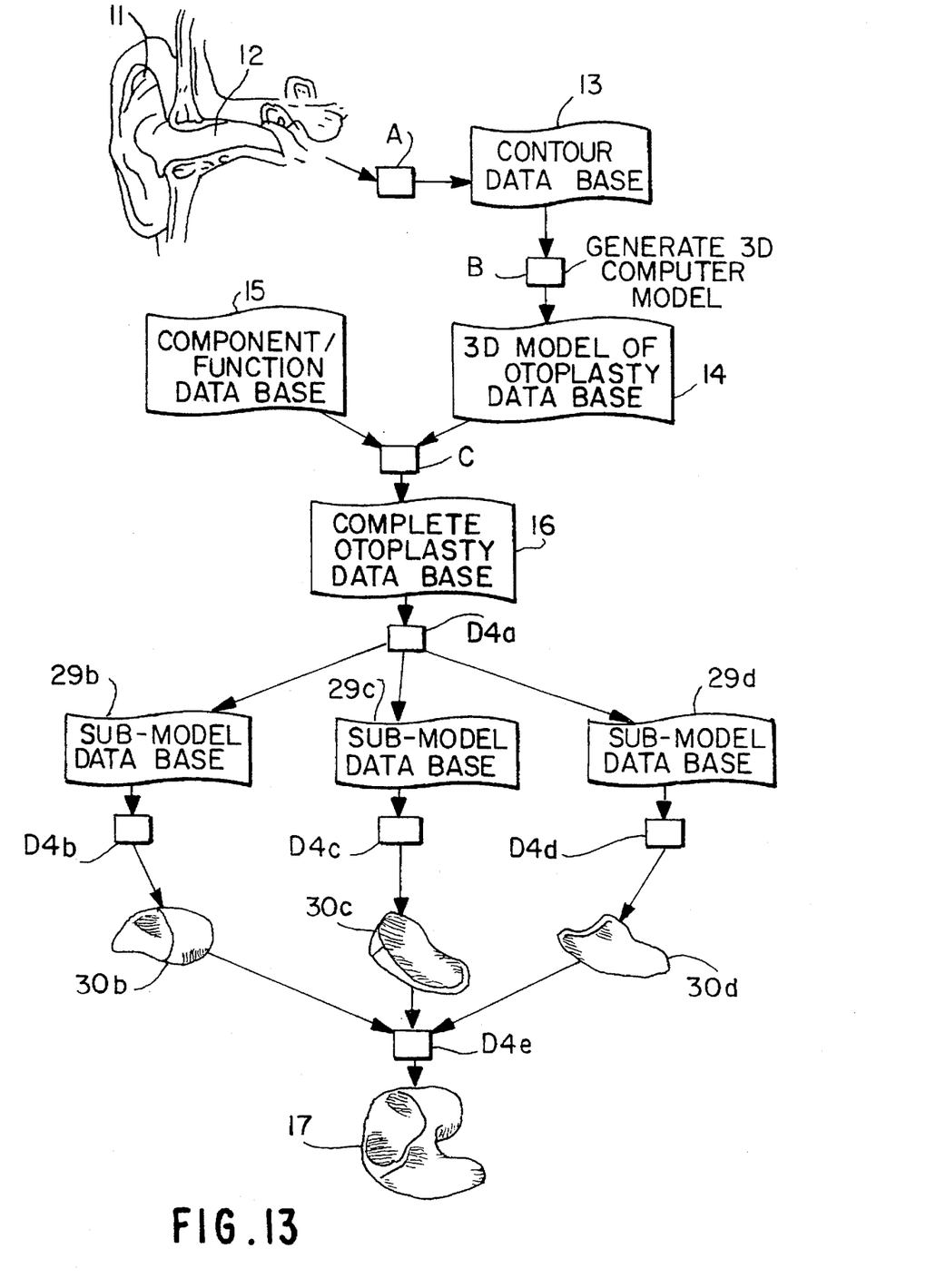
FIG. 13 flow chart of a subtractive method for representation of both the inner and outer contours of an otoplasty or adaptive earpiece.

For example, FIG. 13 shows such a method. The contours of the auditory canal 12 are determined in the manner described in the context of FIG. 3 and later in FIG. 4 up to production and storage of a three-dimensional computer model of the otoplasty or the adaptive earpiece in the data base or in the memory 16, so that a separate description is not necessary here.

Since, as already mentioned, it can be very difficult to produce an otoplasty or adaptive earpiece in one piece, it is suggested to divide the three-dimensional computer model into several three-dimensional sub-models in accordance with step D4a, whereby these sub-models are then stored in the data bases 29b, 29c, 29d... One of the parts 30b, 30c and 30d... is then produced from a material block by means of a computer-controlled milling and/or grinding device in accordance with steps D4b, D4c and D4d... Synthetic resin blocks are used here, for example, which are approximately the same size as the part to be produced. In this method, both the internal and external contours of the individual parts of an otoplasty or adaptive earpiece are thus produced by computer-controlled manufacturing methods. These parts then result in the finished adaptive earpiece via step D4e. In this context, it must be mentioned that there are various possibilities for joining together these individual parts. For example, one might provide pegs and peg holes or projecting edges or shoulders at which the individual parts can be joined to form a whole and then bonded with each other by glueing, welding, polymerization or similar. Equally, it is possible to provide threaded bores in some parts and bores for screws in other parts so that the individual parts can be joined together by screwing. This would have the advantage that the device could also be taken apart for repairs.

Figure 14:
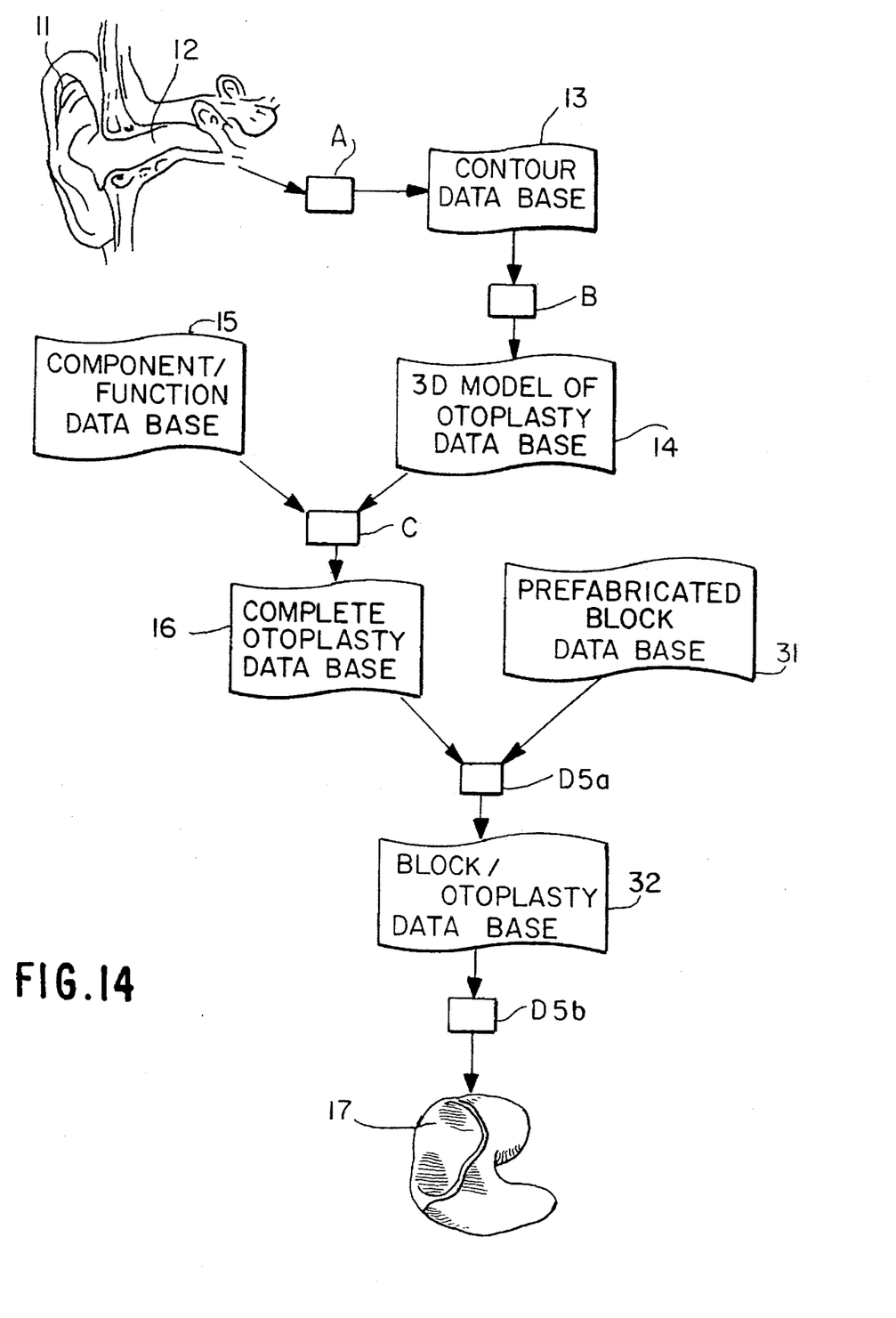
FIG. 14 shaping of the outer contours from blocks with pre-produced interior cavity as a flow chart.
Figure 15A:
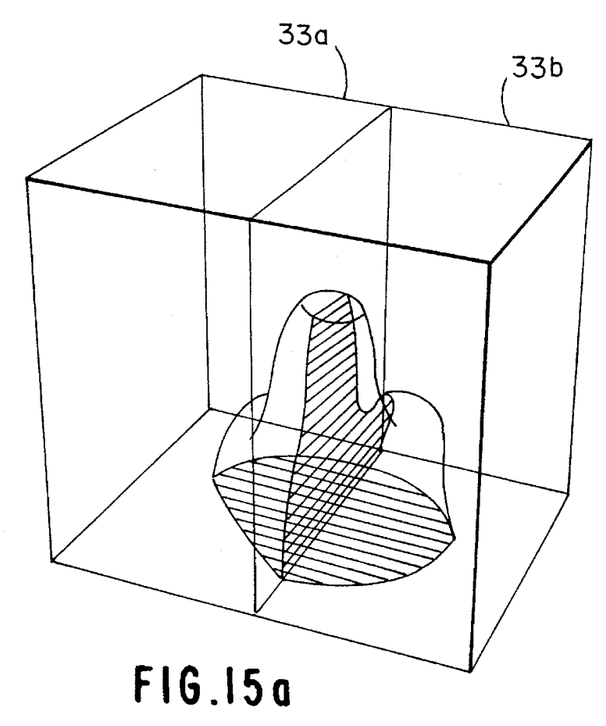
Figure 15B:
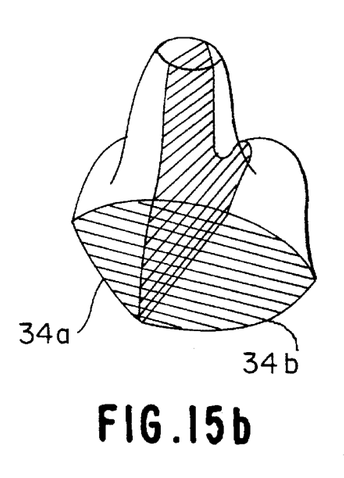
Figure 16:
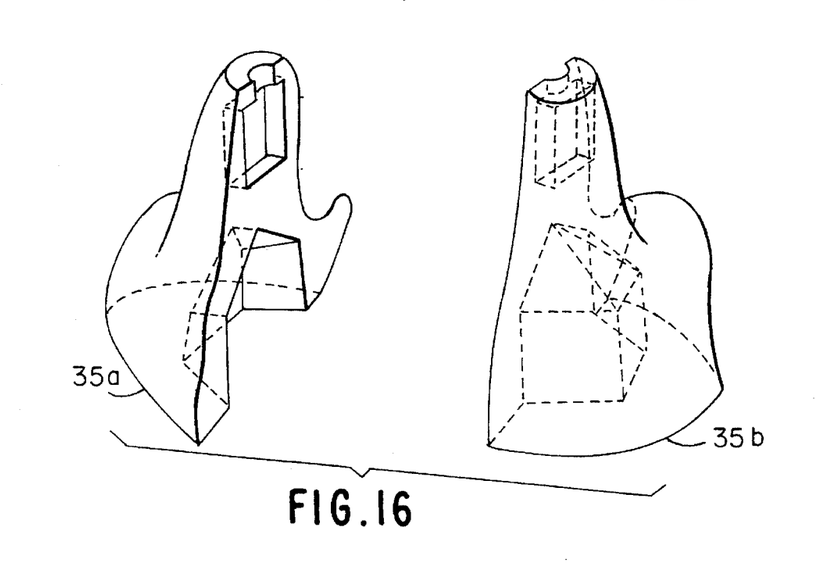
FIG. 16 schematic diagram of two finished parts of an otoplasty.
Figure 17:
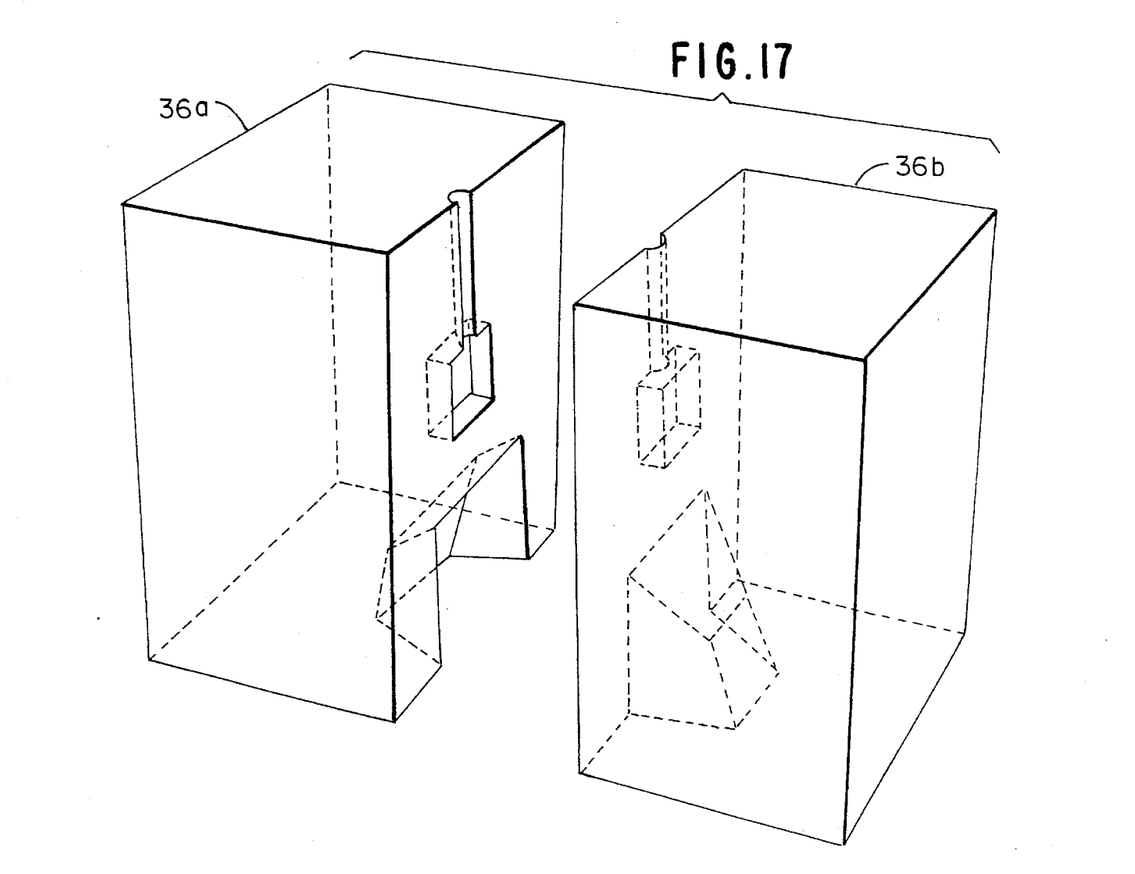
FIG. 17 schematic diagram of parts or blocks with pre-produced interior cavity to be used for an otoplasty in conjunction with the subtractive method.

FIG. 14 shows another method of this kind in conjunction with FIGS. 15 to 17,

Initially, as in FIG. 3 or 4 and FIG. 13, the dimensions of the auditory canal are recorded and then stored in a data memory Or in the data base 16 as a three-dimensional computer model of the otoplasty.

In this method, a further data base 31 is used in which prefabricated raw plastic blocks, as shown in FIG. 17 with 36a and 36b, are stored. These plastic blocks, which may correspond to two or more parts of an otoplasty or the housing of an in-the-ear hearing aid for example, already contain some of the chambers intended for components/functions. In process step D5a, the data is combined from the data bases 16 and 31 so that the corresponding positions and dimensions for production of an otoplasty from the prefabricated plastic blocks can be optimized. This optimized data is then stored in memory 32, which may also be part of the data base.

The data contained in this memory is then used in step D5b to produce the final shape of the otoplasty by machine milling or grinding, i.e. generally by material removal from the outer side until the predefined and previously determined external contours of the otoplasty have been achieved. This is shown in FIG. 15, for example, where the parts 34a and 34b are produced from blocks 33a and 33b.

The finished parts 35a and 35b in accordance with FIG. 16 are then produced by machining from the prefabricated blocks, which already contain the various cavities for the hearing aid and which are shown in 36a and 36b in FIG. 17.

Although the use of drilling or milling devices with numerically controlled machines might initially suggest itself for the subtractive method, use of a so-called Eximer laser operating in the ultraviolet range would also be of particular advantage here since this would permit removal of material from the plastic block or the plastic or synthetic resin blocks with high precision, allowing even highly complex external or internal shapes or surfaces to be produced without difficulty.

This method is therefore particularly suitable for use of this subtractive method.

Although a number of methods for manufacture of otoplasties or adaptive earpieces have been described up to now, starting from the contour dimensions determined from the auditory canal up to computer representation of the three-dimensional otoplasty or adaptive earpiece, this data and its conversion into two-dimensional cross-sections or three-dimensional path curves can also conceivably be used as a basis for other manufacturing methods which thus also lie within the scope of this invention and should not be excluded.

We claim:

1. A method for computer-controlled production of otoplasties or adaptive earpieces comprising at least one part which is individually matched to contours of an auditory canal, said method comprising the steps of:

tracing of the contours of the auditory canal to obtain contour data, digitization of the contour data and storage of the digitized values;

converting the digitized values into a multi-dimensional computer model of the external contours of the otoplasty or adaptive earpiece; and automatically or interactively selecting the components/functions for the interior of the computer model while simultaneously defining the wall thickness and optimizing the positions of the components/functions with respect to optimum function, position and minimum bulk.

2. A method in accordance with claim 1, characterized in that the tracing of the internal contours of the auditory canal is performed by contactless scanning using ultrasound.

3. A method in accordance with claim 1, characterized in that the tracing of the internal contours of the auditory canal is performed by an indirect tracing method comprising the steps of making an ear impression and then non-destructive scanning of this ear impression with radiation which penetrates the latter, whereby the values determined in this way are digitized and stored in digital form.

4. A method in accordance with claim 3, characterized in that scanning of the contours of the ear impression is performed by means of x-rays.

5. A method in accordance with claim 3, characterized in that scanning of the contours of the ear impression is performed with ultrasound.

6. A method in accordance with claim 1, characterized in that the step of tracing the contours of the auditory canal is performed by making an ear impression, cutting the ear impression into thin layers in successive steps, determining the dimensions of these thin cross-sectional layers, and converting the dimensions into digital form and digitally storing them.

7. A method in accordance with claim 6, characterized in that the material of the ear impression is removed by a small amount in each case in successive steps and that the resultant surface is then traced, i.e. by means of a video camera, and the acquired surface values then digitized and stored in digital form.

8. A method in accordance with claim 7, characterized in that the ear impression is embedded in a block of synthetic resin made of a contrasting color, that the block obtained in this way is cut into thin layers in successive steps, and that the dimensions of these thin cross-sectional layers are recorded, converted into digital form and digitally stored.

9. A method in accordance with claim 8 characterized in that the dimensions of successive cross-sections of the block containing the ear impression are determined without destruction by scanning in cross-sections with radiation, whereby the values obtained in this way are then digitized and then digitally stored.

10. A method in accordance with claim 1, characterized in that conversion of the digital representation of the contours of the auditory canal into a three-dimensional representation of the otoplasty or adaptive earpiece takes place by transforming the contours into a very large but finite number of finite elements.

11. A method in accordance with claim 1, characterized in that the contours of the three-dimensional model of the otoplasty or of the adaptive earpiece are transformed into a number of at least partially differentiable three-dimensional curves.

12. A method in accordance with claim 1, characterized in that the various components/functions are manually positioned or entered in the three-dimensional representation of the computer model of the otoplasty or adaptive earpiece using the computer monitor representation.

13. A method in accordance with claim 1, characterized in that this input is made with computer support with simultaneous optimization of the inner surface and its optimum distance from the outer surface of the otoplasty or adaptive earpiece along with simultaneous optimization of the positions/dimensions of the components/functions.

14. A method in accordance with claim 1, characterized in that the arrangement of components/functions and the whole of the optimization process are controlled fully automatically by the computer.

15. A method in accordance with claim 12, characterized in that the three-dimensional representation of the computer model of the otoplasty or of the adaptive earpiece is transformed into a two-dimensional display representation of the kind which conveys a three-dimensional representation when observed with polarizing glasses.

16. A method in accordance with claim 1 characterized by the following additional process steps:

Generation of a computer representation of a sequence of cross sections of the computer model;

build-up of the three-dimensional otoplasty or adaptive earpiece existing as a computer representation by repeated physical production of cross-sections and their progressive build-up on top of each other as a sequence of such cross-sectional layers and reworking of the finished otoplasty or adaptive earpiece after hardening by smoothing the surfaces, polishing, removal of support parts, assembly of the individual parts of the otoplasty or adaptive earpiece when necessary and securing of components when necessary.

17. A method in accordance with claim 16, characterized by the following process steps:

Transformation of the sequence of cross-sections into a sequence of control signals;

use of these control signals to control a focused laser beam and platform capable of controlled movement;

use of a container filled with liquid activated synthetic resin located on the platform capable of controlled movement in order to produce at least parts of the otoplasty or adaptive earpiece by the focused laser beam moved in a controlled manner for build-up of the otoplasty or adaptive earpiece by way of local at least partial polymerization of two-dimensional surface areas of the synthetic resin.

18. A method in accordance with claim 16, characterized by the following process steps:

Conversion of the thus optimized computer model into a sequence of control signals;

use of these control signals for multi-dimensional control of the position of an injection nozzle and a platform capable of controlled movement for production of the complete form of at least parts of the otoplasty or of the adaptive earpiece;

use of a container filled with a passivated liquid synthetic resin and located on the platform capable of controlled movement;

injection of an activator from the nozzle, which is moved to produce at least parts of the otoplasty or adaptive earpiece in a and controlled manner, into the liquid synthetic resin, whereby radiation is continuously present to permit build-up of at least parts of the otoplasty or adaptive earpiece from the synthetic resin which polymerizes at least partially as a result of injection of the activator.

19. A method in accordance with claim 18, characterized in that heat is supplied at least at the place of injection in addition to the targeted supply of the activator by injection.

20. A method in accordance with claim 19, characterized in that the heat is supplied in the form of infrared radiation.

21. A method in accordance with claim 18, characterized in that essentially constant ultraviolet radiation is supplied additionally.

22. A method in accordance with claim 16, characterized in that the cross-sectional layers produced in this way made of plastic are placed on top of each other in layers and permanently bonded to each other by gluing, polymerization, use of heat and/or use of UV radiation.

23. A method in accordance with claim 22, characterized by the following additional process steps:

Conversion of the optimized three-dimensional digital computer model into a sequence of control signals for repeated control of a discharge device for applying successive cross-sectional layers in the form of layers of a hardenable plastic mass corresponding to the patterns of the cross-sectional layers planes on a flat surface with partial hardening of the individual layers in each case;

stacking of the layers on top of each other and hardening of the finished stack to form an otoplasty or an adaptive earpiece and reworking of the otoplasty or adaptive earpieces produced in this way after hardening.

24. A method in accordance with claim 23, characterized by the following additional process steps:

Conversion of the optimized three-dimensional digitized computer model into a sequence of control signals for repeated control of a cutting device for cutting out successive cross-sections from one of a thin plastic film and a thin plastic sheet;

stacking of the cross-sections produced in this way on top of each other to form the otoplasty or adaptive earpiece;

joining of the cross-sections with each other by gluing by heat and/or ultraviolet radiation and reworking of the otoplasty or adaptive earpiece produced in this way.

25. A method in accordance with claim 24, characterized in that a laser beam with computer-controlled movement is used as the cutting device.

26. A method in accordance with claim 24, characterized in that a laser operating in the ultraviolet range and with computer-controlled movement is used as the cutting device.

27. A method in accordance with claim 1 characterized by the following process steps:

Conversion of the thus optimized computer model into a sequence of control signals for following one or more paths in space in such a way that the sum of all paths forms a network, spiral or other polygon which describes the body of the otoplasty or adaptive earpiece on all sides;

use of a container filled with a polymerizable synthetic resin;

use of these control signals for multi-dimensional control of the position of an injection nozzle immersed in the container to inject an activator which hardens the synthetic resin at least partially relatively quickly after emerging from the nozzle under the given conditions and guidance of this nozzle along these paths in a multi-dimensional movement which covers and describes the complete contours of at least parts of the otoplasty or adaptive earpiece.

28. A method in accordance with claim 1 characterized by the following process steps:

conversion of the thus optimized computer model of the otoplasty or adaptive earpiece into a sequence of control signals for following one or more paths in space in such a way that the sum of all paths form a polygon which describes the body of at least parts of the otoplasty or adaptive earpiece on all sides;

use of these control signals for multi-dimensional control of the position of an extrusion nozzle along a three-dimensional path for extrusion onto a surface of a synthetic resin which hardens at least partially relatively quickly in a movement which covers and describes the complete contours of the otoplasty or adaptive earpiece.

29. A method in accordance with claim 28, characterized in that the nozzle is kept stationary, that a platform with controllable movements is used to build up the otoplasty or adaptive earpiece, and that the three-dimensional coordinates of the computer model are used for a computer-controlled movement of the controlled-movement platform along the specified paths in a multi-dimensional movement sequence.

30. A method in accordance with claim 28, characterized in that the relative movement of the nozzle and platform takes place with six degrees of freedom.

31. A method in accordance with claim 28, characterized in that an activated acrylic resin is used as the synthetic resin.

32. A method in accordance with claim 1 characterized by the following process steps:

definition of at least one section which divides the computer model of the otoplasty or adaptive earpiece into at least two parts which can be produced individually by removal of material;

generation of control signals for a material removing device to control the movement of such a device and separation of a block made of plastic which encloses the contour of the otoplasty or adaptive earpiece on all sides into the determined number of part-blocks; and removal of material from the part-blocks on all sides in order to produce corresponding parts of the otoplasty or adaptive earpiece and subsequent joining of these parts.

33. A method in accordance with claim 32, characterized in that the position and form of the cutting planes are optimized to achieve the smallest number of part-blocks and the most simple and practical way of material removal.

34. A method in accordance with claim 32, characterized in that a laser operating in the ultraviolet range is used to remove material from the individual part-blocks.

35. A method in accordance with claim 32, characterized in that the individual parts of the otoplasty or adaptive earpiece are provided with suitable structure for later permanent assembly by one of gluing, polymerization and heat treatment.

36. A method in accordance with claim 32, characterized in that engageable connecting parts such as pegs and bores and bores for screws, locating means are produced in computer-controlled production of the parts for detachable connection of the individual parts of the otoplasty or adaptive earpiece.

37. A method for computer-controlled removal of material from at least one selected block to produce the external contours of the otoplasty or adaptive earpiece in accordance with claim 1 characterized by the following process steps:

storage of at least one set of definitions, dimensions and positions in a data base of all necessary functions/components of already prefabricated otoplasties or adaptive earpieces which are embedded in plastic blocks and where only the internal contours are predefined;

manual, interactive or automatic optimization of the outer surface of the computer model or adaptive earpiece with respect to the position within a selected bock to achieve the minimum final dimensions and an optimum cosmetic appearance.

38. A method in accordance with claim 37, characterized in that a laser operating in the ultraviolet range is used for removal of the material from the selected block or selected blocks.

* * * * *